June 29, 1965
H. W. SCHMIDT
3,191,907
CONICAL VALVE PLUG
Filed July 24, 1962
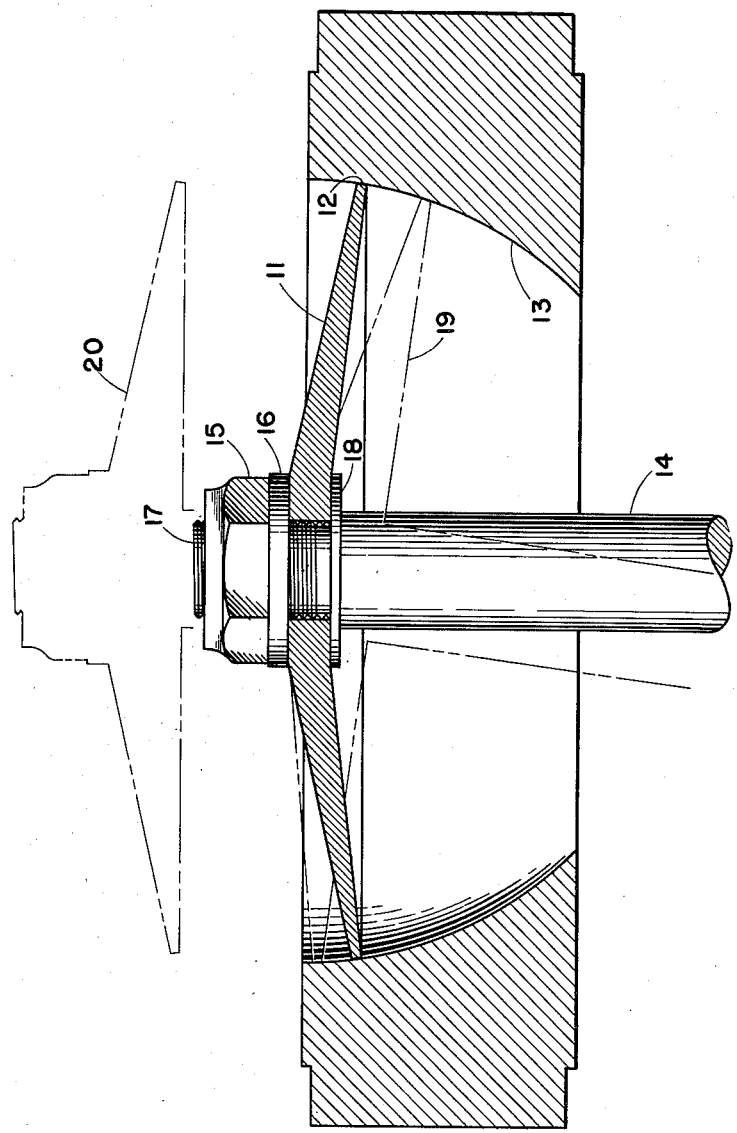
INVENTOR
HAROLD W. SCHMIDT
BY
ATTORNEYS

3,191,907
CONICAL VALVE PLUG

Harold W. Schmidt, North Olmsted, Ohio, assignor to the United States of America as represented by the Administrator of the National Aeronautics and Space Administration
Filed July 24, 1962, Ser. No. 212,174
2 Claims. (Cl. 251—333)
(Granted under Title 35, U.S. Code (1952), sec. 266)

The invention described herein may be manufactured and used by or for the Government of the United States of America for governmental purposes without the payment of any royalties thereon or therefor.

This invention relates to a valve body-seating system, and more particularly, the invention relates to a conical walled valve plug adapted to cooperate with a valve seat having a recessed seating face substantially of a spherical configuration.

With the advent of space investigation, the use of cryogenic fluids has become very extensive, particularly as fuels and oxidants for rockets and other space vehicles and also as a coolant for various electronic equipment and high density flux magnets. Consequently, an urgent need has arisen for valves and valve systems which are effectively able to control the flow of these cryogenic liquids, either into the vessel from the source of supply or within the vessel itself. In many instances, these cryogenic fluids are of a reactive nature, such as liquid fluorine, which is known to be one of the best oxidizers of a chemical propellant system.

Because of the reactive nature of liquid fluorine, a valve system must be employed which is capable of repeatedly forming a zero-leak seal without the need of a soft organic material. In other words, the mating surfaces of the valve body with the valve seat must be composed solely of a substance inert to liquid fluorine, such as aluminum, stainless steel and the like. The configuration of the valve system must be capable of reseating itself perfectly during each cycle of use.

All of the "hard seal" valve body seating arrangements which have been designed for cryogenic liquids or other fluids lose their sealing capacity in a very short time because of distortion and other forms of wearing when the valve plug is brought into a seated position with the valve seat. Much of the wear and distortion of the valve body-seating systems of the prior art is due to the fact that the design of the system is such that the mating surfaces of the valve plug and the valve seat must be forced beyond their elastic limit, permitting deformation resulting in surface damage from fusion which makes for permanent damage after each cycle. Many valves which manifest an apparent zero-leak seal become ruined after the first two or three cycles and must be discarded.

It is, therefore, an object of this invention to provide a valve body-seating system which is capable of forming a zero-leak seal.

It is another object of the instant invention to provide a valve body-seating system capable of forming a zero-leak seal when used with cryogenic liquids.

It is still another object of the instant invention to provide a valve body-seating system which is capable of forming a zero-leak seal when used with reactive cryogenic liquids such as fluorine.

It is still another object of the instant invention to provide a valve body-seating system which is capable of forming and maintaining a zero-leak seal through repeated cycles without any apparent distortion or other damage to the mating surfaces of such valve body-seating system.

Additionally, it is an object of the instant invention to provide a valve body-seating system which is capable for forming a zero-leak seal without distorting the mating surfaces thereof beyond the elastic limit of the material of the system.

Accordingly, these and other objects are accomplished by providing a valve seat having a recessed seating face substantially of a spherical configuration and a valve plug having a circular seating face smaller than the great circle of the spherical valve seat cooperating with the said valve seat to form a zero-leak seal. The valve plug defines at least a frustum of a right circular cone with the said seating face at its base and perpendicular to the hypotenuse of the generating triangle of the cone. When in a seated position, the seating face is coextensive with tangents to the contacting areas of the spherical seat when in a closed position. The valve plug may be designed to conform to widely varying cones, the generating triangles of the cones comprising many different angles. As the cone becomes more shallow, there is an increase in mechanical advantage acquired in the resulting force.

Other objects and advantages will become apparent as the description proceeds.

Referring to the drawing: the figure in the drawing is a cross-sectional view of the conical valve of the instant invention shown in a seated position with a recessed spherical valve seat. The conical valve plug is shown in phantom in an unseated position and is also shown in a fully seated position when moved out of axial alignment.

Referring to the figure in the drawing, the valve system of the instant invention 10 comprises a conical valve plug 11 defining a frustum of the right circular cone generated by a right triangle having a circular seating face 12 forced against spherical recessed seating face 13. The conical valve plug is dimensioned so that the valve seating face 12 is perpendicular to the hypotenuse of the mean triangle of the conical wall of plug 11 and to the tangent of the spherical seat 12 at points of contact. The conical wall is shown preferably as diminishing in thickness from the vertex of the cone to the seating face which provides for a uniform load distribution along the walls of the plug from the forces translated along valve stem 14 by way of locking nut 15 and washer 16. The thickness of the walls of the conical plug is determined by tapering the thickness of the wall so that the cross-sectional areas of the wall cut by a series of coaxial cones having walls perpendicular to the said wall are identical. The cross-sectional areas cut by the cones may be thought of as being successive valve seats providing equal load distribution; one after another forming a continuous wall of equal load supporting strength.

Seating face 12 may or may not be contoured to conform to the spherical shape of the recessed seating face depending upon its thickness. If a wall diminishes in thickness so that the thickness of the seating face permits the entire seating face to seat without distorting the angular edges of the valve plug to exceed the elastic limit, a flat edge may be employed. The plug-seat interface is machined such that when closure force is applied, localized strain as well as total strain on the valve plug is within the elastic limit of the material.

The seating face always defines a circle which is smaller than the great circle of the spherical valve seat and the diameter of the circular face depends upon the angle of the hypotenuse with the generating leg of the triangle. Valve plug 11 is shown in a seated position when out of axial alignment by phantom figure 19. Because of the design of the valve system of the instant invention permitting this unique seating arrangement, it is not necessary that the valve stem be perfectly axially aligned to insure absolute seating. Moreover, such design permits a wider tolerance range than would ordinarily be required. Phantom figure 20 shows valve plug 11 in an unseated position during a normal operational cycle.

The valve body-seating system of the instant invention is equally adaptable for use with the valve assembly of patent application, Serial No. 195,346, filed May 16, 1962, now Patent No. 3,170,486, issued February 23, 1965. This valve assembly is designed for the transport of cryogenic liquid, particularly liquid fluorine from the source of supply to a rocket or missile, which is capable of being quickly disconnected and reconnected thereto. The instant valve plug and seat system may be used in both sections of the said valve assembly which comprises a disconnect section and a stationary section. The valve in the stationary section of this particular valve assembly is operated through compressive forces rather than tensile forces shown to be the case in the drawing. But either mode of effecting seal is equally operative.

It is to be noted that the conical valve plug in the instant invention is designed to obtain the desired mechanical advantage from a force exerted at the vertex which is transmitted over the contacting area at the interface. The ratio of the force per unit area of the seating interface to the force applied to the stem can be varied and is chosen by varying the angle of cone. Since the force applied at the vertex of the cone develops a vector force which is directly proportional to the cosecant of the said angle, it is readily seen that as the cone becomes more shallow, the vector force increases. In the abstract a cone generated by a 30° triangle would have a 1 to 1 force distribution translated from the vertex of the cone to the base of the cone. The valve plug of the instant invention preferably has a wall generated by a triangle, the hypotenuse of which forms an angle $\theta$ with the generating leg in the range of from 8°–18°. The instant invention, however, is not limited to valve plugs having conical walls solely defining cones generated by triangles within this range.

The following table sets forth a comparison between the resultant forces developed at different angles from different applied forces.

TABLE

| Angle $\theta$ | Resultant force from an applied force of— | | |
|---|---|---|---|
| | 250 units | 500 units | 1,000 units |
| 50° | 160 | 320 | 460 |
| 40° | 190 | 380 | 760 |
| 30° | 250 | 500 | 1,000 |
| 20° | 360 | 720 | 1,460 |
| 15° | 480 | 960 | 1,920 |
| 10° | 720 | 1,440 | 2,880 |
| 8° | 900 | 1,800 | 3,600 |
| 6° | 1,100 | 2,400 | 4,800 |

The composition of the materials of construction for the system of the instant invention are only governed by their ability to form a hard seal having sufficient elasticity to permit the desired loads. Such materials include those metals having the strength and elasticity similar to that of aluminum. In addition to aluminum, steel and stainless steel and the like, may be used. It is preferable that the seat be of a harder material than the material of the plug.

It is important that the mating surfaces be machined accurately. A four micron finish is necessary in most instances to take full advantage of the valve assembly designed of the instant invention. When the machining is accurate and kept within the desired tolerances no cushion pressure (pressure exerted by biasing means and the like) is needed to effect a zero-leak seal; the weight of the plug or the line pressure are usually sufficient to effect the zero-leak seal.

The following example is given by way of illustration and not by way of limitation.

*Example*

A valve plug seat arrangement similar to that shown in the drawing was designed and constructed. The plug was made from aluminum and the seat from stainless steel. The plug and seat were fitted into a standard Annin valve body with the original valve plug and seat removed. The plug of the instant invention had the following dimensions:

Diameter of circle defined by the face of the plug was 2.000 inches.

The vertex of the frustum of the conical plug was a flat wall, 0.50 inch in diameter having a 0.25 inch diameter central aperture for a valve stem. The wall at the vertex was 0.100 inch thick.

The height of the frustum of the cone from the base to the vertex was 0.195 inch.

The seating face at the base was 11° from the vertical as was the hypotenuse of the mean generating triangle from the horizontal.

The thickness of the seating face from the base to the upper edge of the face was 0.025 inch.

The spherical seat was a polished spherical concave surface defining a spherical segment having a 1.016 inch radius. The seat was cut into a stainless steel block 0.69 inch thick.

The valve body and assembly were then fitted into a line connecting a gaseous helium source with the bottom of a container filled with water.

Various line pressures were employed and water container observed for bubbles.

| Run No. | Line press. | | Time |
|---|---|---|---|
| 1 | 18 p.s.i. | No leak | 9:12 |
| | 19 p.s.i. | | 9:17 |
| 2 | 51 p.s.i. | No leak | 9:18 |
| | 51 p.s.i. | | 9:23 |
| 3 | 99 p.s.i. | No leak | 9:24 |
| | 98.5 p.s.i. | | 9:31 |

Line press. dropped to 0 p.s.i.
Value cycled slowly once

| | | | |
|---|---|---|---|
| 4 | 51 p.s.i. | No leak | 9:37 |
| | 51.5 p.s.i. | | 9:42 |
| 5 | 101.5 p.s.i. | No leak | 9:42 |
| | 101 p.s.i. | | 9:47 |

Line press. dropped to 0 p.s.i.
Valve disassembled
Seat rotated 180°, valve reassembled
Instru. press. 14.5 p.s.i.

| | | | |
|---|---|---|---|
| 6 | 53.5 p.s.i. | No leak | 10:00 |
| | 54 p.s.i. | | 10:05 |
| 7 | 103.5 p.s.i. | No leak | 10:06 |
| | 103.5 p.s.i. | | 10:11 |

Line press. backed off slowly
Fast release
Slow reseat
Instru. press. 14.7 p.s.i.

| | | | |
|---|---|---|---|
| 8 | 98 p.s.i. | No leak | 10:15 |
| | | | 10:16 |

Fast cycle via 3 way control valve

| | | | |
|---|---|---|---|
| 9 | 99.5 p.s.i. | No leak | 10:17 |
| | 99.0 p.s.i. | | 10:22 |

Fast cycle #2—Quick pressure check, no visible leak at 100 p.s.i.
    #3—Quick pressure check, no visible leak at 100 p.s.i.
    #4—Quick pressure check, no visible leak at 100 p.s.i.
    #5—Quick pressure check, no visible leak at 100 p.s.i.
    #6—Cycled in quick succession without pressure checking in between.
    #7—Cycled in quick succession without pressure checking in between.
    #8—Cycled in quick succession without pressure checking in between.
    #9—Cycled in quick succession without pressure checking in between.
    #10—Cycled in quick succession without pressure checking in between.

| Run No. | Line press. | | Time |
|---|---|---|---|
| 10 | 99.5 p.s.i. | No leak | 10:27 |
|  | 99.0 p.s.i. |  | 10:32 |

10 fast cycles total=20 cycles

| | | | |
|---|---|---|---|
| 11 | 99 p.s.i. | No leak | 10:34 |
|  | 99 p.s.i. |  | 10:39 |

10 fast cycles total=30 cycles

| | | | |
|---|---|---|---|
| 12 | 102 p.s.i. | No leak | 10:41 |
|  | 100.5 p.s.i. |  | 10:46 |

20 fast cycles total=50 cycles

| | | | |
|---|---|---|---|
| 13 | 102 p.s.i. | No leak | 10:49 |
|  | 102 p.s.i. |  | 10:54 |

Line press. backed off—broke valve down
Rotated seat 90°
Reassembled valve
Instru. press. 14.6 p.s.i.

| | | | |
|---|---|---|---|
| 14 | 100.5 p.s.i. | No leak | 11:05 |
|  | 98.5 p.s.i. |  | 11:10 |

20 fast cycles total=70 cycles

| | | | |
|---|---|---|---|
| 15 | 100 p.s.i. | No leak | 11:15 |
|  | 98 p.s.i. |  | 11:20 |

30 fast cycles total=100 cycles
Instru. press. 14.6 p.s.i.

| | | | |
|---|---|---|---|
| 16 | 101 p.s.i. | No leak | 11:29 |
|  | 99 p.s.i. |  | 11:34 |

Vented system and opened valve
Closed valve, Instru. press. 14.5 p.s.i.
Loaded stem with 100# force, instru. press. 16.5 p.s.i.

Fast cycle #1—No leak, instru. press. 16.8 p.s.i.
Fast cycle #10—No leak, instru. press. 17 p.s.i.
Instru. press. backed off to 14.6 p.s.i.

| Run No. | Line press. | | Time |
|---|---|---|---|
| 17 | 100 p.s.i. | No leak | 12:45 |
|  | 97.5 p.s.i. |  | 12:50 |

While many and preferred forms of the instant invention are disclosed herein, it is not intended that the invention be limited thereto. It is to be understood that all of the many and preferred forms not specifically disclosed but coming within the scope of the appendant claims are also part of the instant invention.

What is claimed is:

1. In a valve assembly, a valve seat comprising a rigid member having a recessed seating face of substantially spherical configuration, and a valve plug cooperating therewith to form a zero leak seal, said valve plug comprising a rigid member shaped in the form of a frustum of a right circular cone having a wall uniformly diminishing in thickness from the top of said frustum to the bottom of said frustum, said right circular cone being generated by a right triangle, the hypotenuse of which forms an angle with the generating leg of the triangle in the range of 8° to 18°, the base of said frustum being dish-shaped, the bottom of said wall terminating in an annular seating surface, said surface being perpendicular to the hypotenuse of a mean generating triangle of the right circular cone, said hypotenuse of said mean triangle of the generating cone being coextensive with a great circle of the spherical seat, said seating surface being adapted to cooperate with said valve seat, said seating surface being adapted to cooperate with said valve seat seating face to form said zero leak seal, said wall uniformly diminishing in thickness so as to uniformly distribute the load throughout the wall during the seating of the valve plug in the valve seat.

2. Apparatus according to claim 1 and wherein said valve plug includes a valve stem attached thereto to move the plug into and out of contact with said valve seat seating face.

References Cited by the Examiner
UNITED STATES PATENTS

| 1,654,516 | 12/27 | Wilson | 251—334 |
| 1,686,849 | 10/28 | Frauenheim | 251—333 XR |
| 1,800,127 | 4/31 | Wilson | 251—334 |
| 2,147,332 | 2/39 | Cornelius | 251—334 XR |

References Cited by the Applicant
UNITED STATES PATENTS 2,982,299   5/61   Ksieski et al.

WILLIAM F. O'DEA, *Primary Examiner.*

ISADOR WEIL, *Examiner.*